United States Patent
Lee et al.

(10) Patent No.: US 8,538,977 B2
(45) Date of Patent: *Sep. 17, 2013

(54) DYNAMICALLY SWITCHING THE SERIALIZATION METHOD OF A DATA STRUCTURE

(75) Inventors: Stephanie Hui-An Lee, Saratoga, CA (US); David L. Levish, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/412,021

(22) Filed: Mar. 5, 2012

(65) Prior Publication Data

US 2012/0254884 A1    Oct. 4, 2012

Related U.S. Application Data

(63) Continuation of application No. 13/072,953, filed on Mar. 28, 2011.

(51) Int. Cl.
*G06F 17/30* (2006.01)

(52) U.S. Cl.
USPC .......................................... 707/760; 710/769

(58) Field of Classification Search
USPC ................... 707/754–766; 710/767–769
See application file for complete search history.

(56) References Cited

U.S. PATENT DOCUMENTS

| | | | |
|---|---|---|---|
| 7,430,627 | B2 | 9/2008 | McKenney |
| 7,747,996 | B1 | 6/2010 | Dice |
| 2002/0124118 | A1 | 9/2002 | Colley et al. |
| 2003/0204691 | A1 | 10/2003 | Chang et al. |
| 2003/0212741 | A1* | 11/2003 | Glasco .................... 709/203 |
| 2004/0064601 | A1 | 4/2004 | Swanberg |
| 2004/0215645 | A1 | 10/2004 | Redpath |
| 2004/0220946 | A1 | 11/2004 | Krishnaprasad et al. |
| 2004/0244012 | A1 | 12/2004 | Massarenti |
| 2006/0031676 | A1 | 2/2006 | Vantalon et al. |
| 2006/0265373 | A1 | 11/2006 | McKenney et al. |
| 2007/0088890 | A1 | 4/2007 | Wieland et al. |
| 2007/0198792 | A1 | 8/2007 | Dice et al. |
| 2007/0260942 | A1 | 11/2007 | Rajwar et al. |
| 2008/0320476 | A1 | 12/2008 | Wingard et al. |
| 2010/0070740 | A1 | 3/2010 | Allen et al. |
| 2012/0042062 | A1 | 2/2012 | Borade et al. |
| 2012/0042064 | A1 | 2/2012 | Gagnon et al. |

FOREIGN PATENT DOCUMENTS

WO        2010034777        4/2010

* cited by examiner

*Primary Examiner* — Wilson Lee
(74) *Attorney, Agent, or Firm* — Brian J. Teague

(57) ABSTRACT

Embodiments of the invention comprise a method for dynamically switching a serialization method of a data structure. If use of the serialization mechanism is desired, an instruction to obtain the serialization mechanism is received. If use of the serialization mechanism is not desired and if the serialization mechanism is in use, an instruction to obtain the serialization mechanism is received. If use of the serialization mechanism is not desired and if the serialization mechanism is not in use, an instruction to access the data structure without obtaining the serialization mechanism is received.

9 Claims, 4 Drawing Sheets

DYNAMICALLY SWITCHING THE SERIALIZATION METHOD OF A DATA STRUCTURE

CROSS-REFERENCE TO RELATED APPLICATIONS

This application is a continuation of and claims priority to U.S. patent application Ser. No. 13/072,953, filed Mar. 28, 2011, the contents of which is incorporated herein by reference in its entirety.

BACKGROUND

The present invention relates to serialization of resources.

In a multitasking, multiprocessing environment, resource serialization is the technique used to coordinate access to resources that are used by more than one application. Programs that change data need exclusive access to the data. Otherwise, if several programs were to attempt to update the same data at the same time, the data could be corrupted.

Serialization of resources typically falls into one of two categories: (1) nearly instantaneous, i.e., for the duration of an instruction or a few instructions, such as when updating a counter; and (2) longer term, usually accomplished through the use of a lock, latch, semaphore, token, or similar construct (referred to herein as a "serialization mechanism" or "SM"), such as when updating several related values or managing a linked list. The first method is commonly referred to as "latchless serialization," and will be referred to herein as "no-SM serialization."

The first method generally offers better performance while the second generally offers much greater flexibility. In most cases, the choice to use one method or the other is clear. However, it is possible to have a situation in which one method may be preferred most of the time but the other method is occasionally needed. The serialization mechanism can also be used to halt activity on a particular resource. The no-SM method provides no way to suspend activity, as the only alternative to an eventual successful update is to force a failure that will not be retried. Both methods cannot be used at the same time without imposing a hierarchy that requires both mechanisms to be used in a certain order. A common way of handling this situation is to use a serialization mechanism if there is ever going to be a need to do so. This sacrifices performance but provides the function that is needed.

BRIEF SUMMARY

In one embodiment of the invention, a method for dynamically switching a serialization method of a data structure comprises obtaining a serialization mechanism if use of a serialization mechanism is desired. If use of the serialization mechanism is not desired, it is determined whether the serialization mechanism is in use. If use of the serialization mechanism is not desired and if the serialization mechanism is in use, the serialization mechanism is obtained before accessing the data structure. If use of the serialization mechanism is not desired and if the serialization mechanism is not in use, the data structure is accessed without obtaining the serialization mechanism.

In addition to the method of dynamically switching a serialization method of a data structure, as described above, other aspects of the present invention are directed to corresponding systems and computer program products for dynamically switching a serialization method of a data structure.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Embodiments of the invention may provide the ability to, by carefully managing the transition, enable a serialization method used to protect a resource to be switched from one method to another and back to the original method without requiring an outage or restart of the software implementing the invention.

Embodiments of the invention use a mode indicator to indicate which method of serialization is in use (i.e., either with or without use of a serialization mechanism), a predetermined serialization mechanism (e.g., lock, latch, or any suitable serialization mechanism), and a counter which is atomically updated and used to track the number of tasks that are serialized without the serialization mechanism (referred to herein as the "no-SM counter").

It is presumed in the implementation of embodiments of the invention described herein that serialization without a serialization mechanism is desired (as opposed to serialization using a serialization mechanism, such as a lock or latch) for performance reasons and represents the normal, default state for the resource being updated. Alternatively, embodiments of the invention may utilize serialization with a serialization mechanism as the normal, default state for the resource being updated. The steps for switching to the use of the serialization mechanism for serialization involves at least one task initiating the change and other tasks, if any are active, reacting to the change. After some period of time, a task (possibly but not necessarily the one the initiated the change) later starts the process to revert back to the original serialization method. There could be any number of tasks performing either action. While the manner in which the updates are being done to the protected resource may differ depending on which method of serialization is being used, the herein described embodiments for changing the serialization method work regardless of the specific type of serialization mechanism used.

Figure 1:
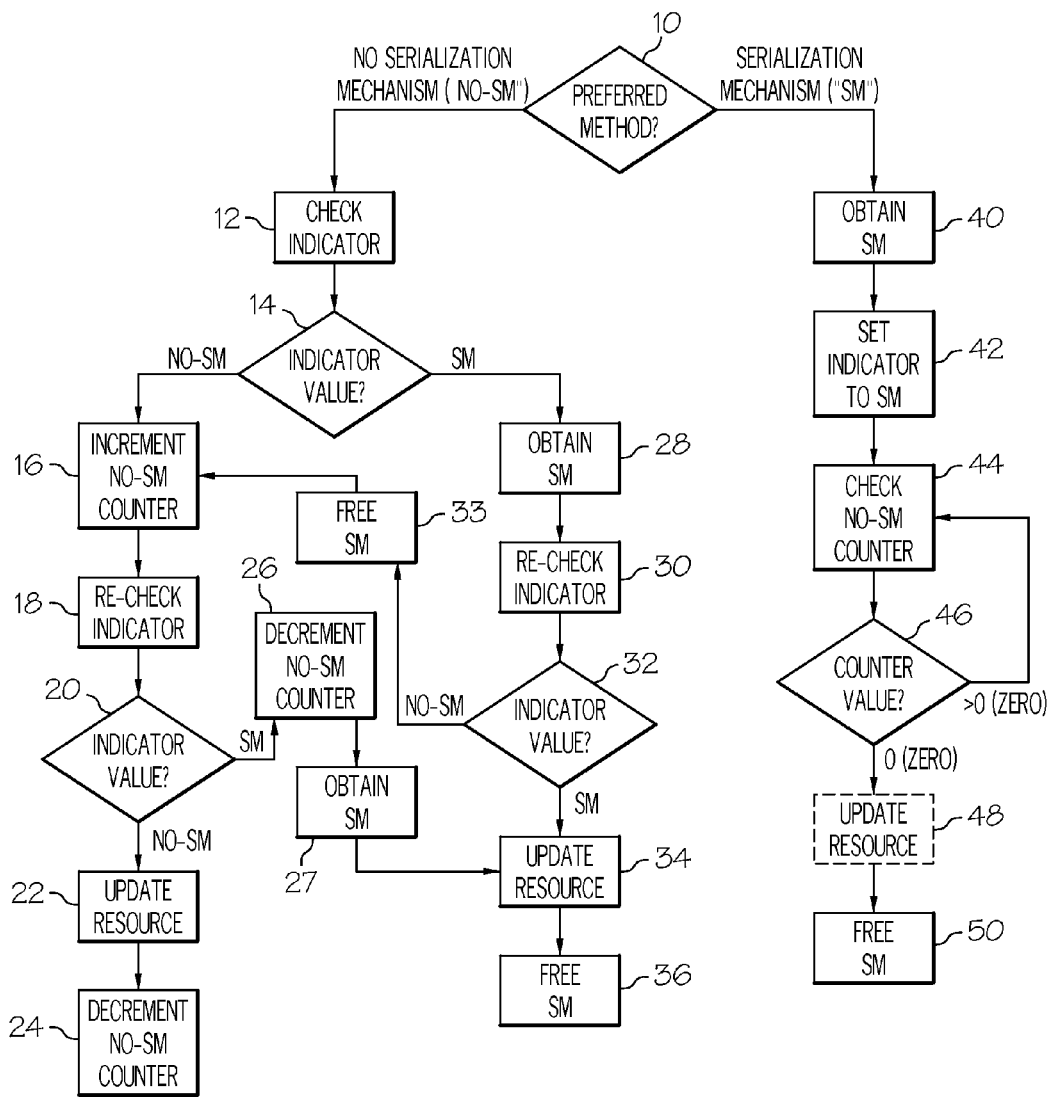
FIGS. 1 and 2 are flowcharts of a method of dynamically switching a serialization method of a data structure, in accordance with an embodiment of the present invention.
Figure 2:
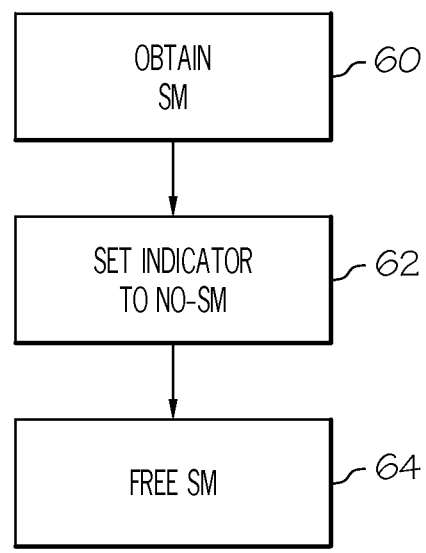

Referring now to FIGS. 1 and 2, flowcharts of a method of dynamically switching a serialization method of a data structure are illustrated in accordance with an embodiment of the present invention. A task that needs to update a resource will determine 10 the desired method (via the serialization mechanism or without the serialization mechanism) of serialization. As discussed above, this will generally depend on whether the update will be instantaneous or over a longer period of time.

If the desired method is without the serialization mechanism ("no-SM"), the task will check 12 the serialization indicator to determine which serialization method is currently in use (the default method will typically be the method without the serialization mechanism). If it is determined 14 that the no-SM method is currently in use (based on the setting of the serialization indicator when checked at block 12), the task will atomically increment 16 the no-SM counter.

The task will re-check 18 the serialization indicator to verify that the serialization method has not changed. The serialization method should not be changed while the task counter is non-zero (thus incrementing the counter should prevent other tasks from changing the serialization method), but the serialization method may have changed between the time the indicator was first checked and when the task counter was incremented. If it is determined 20 that the indicator is still indicating that the no-SM method is in use, the task can perform 22 whatever updates are desired to the resource. When the task is finished updating the resource, the task will atomically decrement 24 the no-SM counter.

If it is determined 20 that the indicator has changed since first checked and is now indicating that the SM method is in use, the task will decrement 26 the no-SM counter and obtain 27 the serialization mechanism. The task can then perform 34 whatever updates are desired to the resource and free 36 the serialization mechanism when finished updating the resource.

If the desired method is without the serialization mechanism ("no-SM") and it is determined at block 14 that the SM method is currently in use (based on the setting of the serialization indicator checked at block 12), the task will obtain 28 the serialization mechanism. After the latch has been obtained, the task will re-check 30 the serialization indicator to verify that the serialization method has not changed. The serialization method may have changed while the task was waiting to gain ownership of the serialization mechanism. If it is determined 32 that the indicator has changed since first checked and is now indicating that the no-SM method is in use, the task will free 33 the serialization mechanism and attempt to update the resource using the no-SM process (blocks 16-24). If it is determined 32 that the indicator has not changed since first checked and is still indicating that the SM method is in use, the task can perform 34 whatever updates are desired to the resource and free 36 the serialization mechanism when finished updating the resource.

Blocks 12, 14, and 28-36 may also be implemented if the desired method is to use the serialization mechanism.

If the desired method is to use the serialization mechanism, as determined at block 10, the task may assume that the current method is without the serialization mechanism (as discussed above, serialization without the serialization mechanism is the likely default mode). The task will obtain 40 the serialization mechanism. This ensures that tasks not using the serialization mechanism will either finish or will be suspended on the serialization mechanism after finding that the serialization method has changed. The task will set 42 the indicator to indicate use of the serialization mechanism. The task will check 44 the no-SM counter to determine if any tasks are currently updating the resource. If it is determined 46 that the no-SM counter has a value greater than zero, the task will wait for the counter to go to zero. This may be facilitated by the use of a series of timed waits or similar means. If the value of the counter is zero, the task may optionally update 48 the resource. This is optional as the task may not need to update the resource at this time, but rather may be switching the serialization method such that this task or a different task may use the serialization mechanism at a future point in time. Finally, the task will free 50 the serialization mechanism.

FIG. 2 illustrates the process of changing the serialization method to not use the serialization mechanism. To do so, the task obtains 60 the serialization mechanism and sets 62 the indicator to indicate that the serialization mechanism is not being used. The task then frees 64 the serialization mechanism. Any tasks that were waiting for ownership of the serialization mechanism will check the indicator bit after the serialization mechanism is granted, will find that the serialization method has changed, and will then free the serialization mechanism and retry using the no-SM method (as illustrated in blocks 30, 32, and 33 of FIG. 1).

Figure 3:
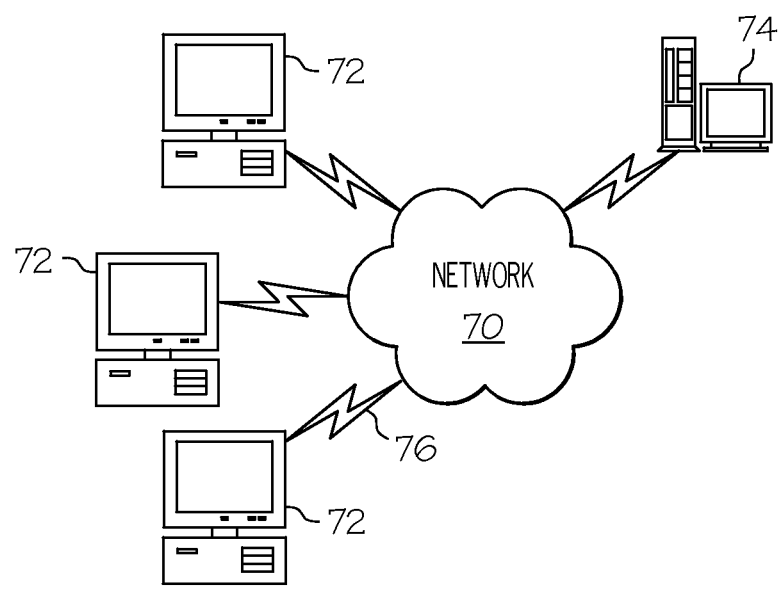
FIG. 3 is a schematic block diagram of a computer network in which embodiments of the present invention may operate.

FIG. 3 is a schematic block diagram of a computer network in which embodiments of the present invention may operate. Computers 72 and server 74 provide processing, storage, and input/output devices executing application programs and the like. Computers 72 may be linked over communication link 76 through communications network 70 to each other and to other computing devices, including server 74. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. However, computers 72 and server 74 may be linked over any suitable communication network. In the system of FIG. 3, the resources to be updated and the tasks to perform the updating may reside, for example, (a) all on server 74, (b) all on computer 72, (c) on a combination of server 74 and one or more of computers 72, or (d) any combination thereof.

In addition to the client-server arrangement of FIG. 3, embodiments of the invention may operate in any client-server arrangement or in any networked arrangement in which resources to be updated and tasks to perform the updating may reside on separate elements in a network. For example, embodiments of the invention may operate in a mobile communications/data architecture (such as a mobile telecommunications network adhering to the International Mobile Telecommunications-2000 (also termed 3G) or IMT-Advanced (also termed 4G) standards), in which a mobile telecommunications device (e.g., cell/mobile telephone) communicates.

Figure 4:
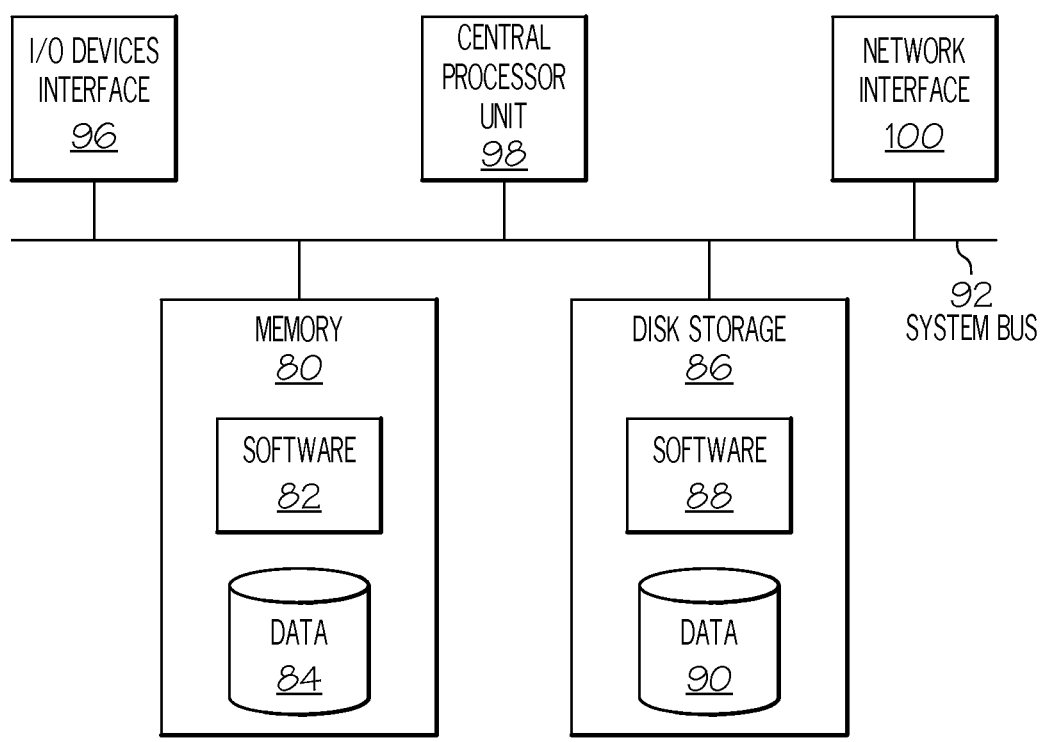
FIG. 4 is a schematic block diagram of a computer in the network of FIG. 3.

FIG. 4 is a diagram of one possible internal structure of a computer (e.g., computer 72) in the system of FIG. 3. Each computer typically contains system bus 92, where a bus is a set of hardware lines used for data transfer among the components of a computer. Bus 92 is essentially a shared conduit that connects different elements of a computer system (e.g., processor, disk storage, memory, input/output ports, network ports, etc.) that enables the transfer of information between the elements. Attached to system bus 92 is I/O device interface 96 for connecting various input and output devices (e.g., displays, printers, speakers, microphones, etc.) to the computer. Alternatively, the I/O devices may be connected via one or more I/O processors attached to system bus 92. Network interface 100 allows the computer to connect to various other devices attached to a network (e.g., network 70 of FIG. 3). Memory 80 provides volatile storage for computer software instructions 82 and data 84 used to implement an embodiment of the present invention. Disk storage 86 provides non-volatile storage for computer software instructions 88 and data 90 used to implement an embodiment of the present invention. Central processor unit 98 is also attached to system bus 92 and provides for the execution of computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

"Computer" or "computing device" broadly refers to any kind of device which receives input data, processes that data through computer instructions in a program, and generates output data. Such computer can be a hand-held device, laptop or notebook computer, desktop computer, minicomputer, mainframe, server, cell phone, personal digital assistant, other device, or any combination thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method for dynamically switching a serialization method of a data structure, the method being implemented by a computer, the method comprising:
   (a) determining if use of a serialization mechanism is desired;
   (b) if it is determined that use of the serialization mechanism is desired, obtaining the serialization mechanism;
   (c) if it is determined that use of the serialization mechanism is not desired, determining whether the serialization mechanism is in use;
   (d) if it is determined that use of the serialization mechanism is not desired and if it is determined at (c) that the serialization mechanism is in use, obtaining the serialization mechanism before accessing the data structure; and
   (e) if it is determined that use of the serialization mechanism is not desired and if it is determined that the serialization mechanism is not in use, accessing the data structure without obtaining the serialization mechanism.

2. The method of claim 1, wherein determining whether the serialization mechanism is in use comprises checking a status of a serialization mode indicator.

3. The method of claim 1, further comprising:
   if use of the serialization mechanism is not desired and if the serialization mechanism is not in use, incrementing a counter for tracking a number of tasks being serialized without using the serialization mechanism prior to accessing the data structure without obtaining the serialization mechanism.

4. The method of claim 3, further comprising:
   decrementing the counter after accessing the data structure.

5. The method of claim 3, further comprising:
   determining again whether the serialization mechanism is in use after incrementing the counter and prior to accessing the data structure without obtaining the serialization mechanism.

6. The method of claim 1, further comprising:
   if use of the serialization mechanism is desired, (a) setting a serialization mode indicator to indicate that the serialization mechanism is in use, (b) determining that a counter for tracking a number of tasks being serialized without using the serialization mechanism is set to zero, and (c) releasing the serialization mechanism after the counter has been determined to be set to zero.

7. The method of claim 1, further comprising:
   if use of the serialization mechanism is not desired and if the serialization mechanism is in use, determining that a counter for tracking a number of tasks being serialized without using the serialization mechanism is set to zero prior to accessing the data structure.

8. The method of claim 7, further comprising:
   determining again whether the serialization mechanism is in use after determining that the counter is set to zero and prior to accessing the data structure.

9. The method of claim 1, further comprising:
   if use of the serialization mechanism is no longer desired, (a) obtaining the serialization mechanism, (b) setting a serialization mode indicator to indicate that the serialization mechanism is not in use, and (c) releasing the serialization mechanism.

* * * * *